Patented Feb. 13, 1940

2,189,854

UNITED STATES PATENT OFFICE 2,189,854

EMULSION PRODUCT

Delbert F. Brown, Westfield, and Hugh C. De Hoff, Roselle Park, N. J., assignors to Standard Oil Development Company, a corporation of Delaware No Drawing. Application December 14, 1937, Serial No. 179,666

3 Claims. (Cl. 260—32)

This invention relates to novel emulsions and methods of producing and using same and particularly to the preparation of emulsions containing a large amount of alcohol. This invention is an improvement over the general type of emulsions described in our Patent 1,927,916 and also a continuation-in-part of our application Ser. No. 139,206 filed April 27, 1937.

In the preparation of various emulsifying compositions it is often desirable in corporate a relatively high percentage of an alcohol. However, alcohols, as is well known, are generally difficult to emulsify, particularly with mineral oil. In fact, alcohols are often used for breaking mineral oil emulsions.

In our Patent 1,927,916 a method is described which was found to be satisfactory for producing emulsions containing more than 15% of an alcohol, even up to 30% or 50% of alcohol, by incorporating an emulsifying agent having emulsifying properties corresponding to those of gums obtained from plants belonging to the order of Leguminosae (such as gum tragacanth), with water and alcohol, agitating and then adding the oil with continued agitation. A typical formula of an alcohol emulsion made by that method is as follows:

| Ingredient | Parts |
|---|---|
| Ethyl alcohol | 40 |
| Gum tragacanth | 1 |
| Mineral white oil | 12 |
| Water | 43 |

Our application Ser. No. 139,206 describes how it has been found possible to adapt the original emulsions and methods described in the above mentioned patent, in order to produce emulsions which are both at the same time fluid and yet contain a relatively large proportion of finely divided suspended solids. For example, cleaning and polishing emulsions in fluid form are described containing 5% to 25% of suspended abrasive powder and containing 15% to 50% of a low molecular weight aliphatic alcohol such as ethyl alcohol or isopropyl alcohol. That application also describes how it was found possible to make fluid solid-containing emulsions by incorporating in the oil phase thereof a suitable thickening agent, particularly a mineral-oil-soluble thickener such as a hydrocarbon polymer produced by polymerizing isobutylene at low temperature with boron fluoride as a catalyst.

It is the primary object of the present application to claim broadly the use of such thickening agents in all types of emulsions containing large amounts of alcohol, regardless of the presence or absence of any finely divided suspended solids, as it has been found that such thickeners are extremely useful in improving the stability and durability of alcohol emulsions, particularly with regard to their resistance to deterioration by changes in temperature as well as making them less sensitive to the presence of acids, bases and salts which are known to have a very strong tendency to break emulsions, particularly emulsions containing a large proportion of alcohol. Another object of the invention is to provide a novel method of controlling the consistency of the emulsions and emulsified products and to provide a superior method for preparing emulsions of a semi-solid consistency containing large amounts of alcohol, without adding solids.

For the thickener to be used according to the present invention, it is preferred to use a substantially completely saturated aliphatic hydrocarbon substance having a high molecular weight preferably above 1,000, e. g. 2,000, 5,000, 15,000, 80,000, 150,000 or even 300,000 or more. Such substances can be produced by polymerizing isoolefins such as isobutylene, 2-methyl butene-1 and the like at low temperatures, e. g. below $-10°$ C. and preferably substantially lower, e. g. $-50°$ C. or even $-100°$ C. or lower in the presence of a Friedel-Crafts type catalyst such as boron fluoride, aluminum chloride, etc. In carrying out the reaction it is desirable to provide efficient cooling means either by adequate cooling coils or by use of a volatilizable inert diluent such as liquified propane, ethane or ethylene. The production of high molecular weight polymers is favored by the use of lower temperatures and materials of the highest purity. In other words, small amounts of impurities, particularly sulfur compounds, tend to prevent the production of the extremely high molecular weight polymers. In carrying out the polymerization the boron fluoride may be bubbled into a liquified mixture of isobutylene and propane at the desired temperature with or without the use of a slight amount of pressure to keep the propane or other diluent in the liquified state. Cooling may be effected by permitting evaporation of the diluent.

These polymers are substantially colorless, plastic and/or elastic solids which are substantially completely saturated with respect to hydrogen and are extremely stable against oxidation and attack by acids, alkalies and other chemical agents. These polymers have an iodine number substantially below 30 and generally below 10, oftentimes being as low as 1, especially when they have been freed by suitable means such as precipitation with acetone or other suitable organic liquids from polymers of lower molecular weight than the desired minimum, e. g. about 1,000. They are insoluble in water and insoluble in many oxygen-containing organic solvents but are readily soluble in hydrocarbon solvents, particularly in normally liquid mineral oil products such as petroleum ether, kerosene, and lubricating oil. These polymers have the valuable property of increasing the viscosity of liquids in which they are dissolved, the amount of this increase being directly proportional to the amount of polymer in solution and the molecular weight of the polymer; for example, much less poly-isobutylene having a molecular weight of 80,000 is required to produce the same increase in viscosity as a poly-isobutylene of 15,000 molecular weight. Another valuable characteristic of these polymers is that they impart to mineral oils a higher viscosity index which is a viscosity-temperature relationship. The higher the V. I. the better is this relationship and the less change in viscosity with any certain changes in temperature. This property is particularly valuable in the present invention because emulsions generally, and higher alcohol emulsions particularly, are very susceptible to slight changes in temperature, probably by reason of the fact that slight changes in the viscosity, surface tension and other properties of the oil phase and water phase have a great effect on the stability of the film at the interface between the tiny globules of the disperse phase.

Another advantage of the present invention accrues from the fact that the above described thickeners are highly resistant to oxidation. This means that they do not tend to form the various types of oxygen derivatives, alcohols, aldehydes, acids, ketones, etc. which normally result from the oxidation and tend to break emulsions of hydrocarbons. It is probable that the superior results obtained by the present invention are due to a combination of the high V. I. and viscosity imparting characteristics and the great resistance to oxidation.

Although the above described iso-olefin polymers are preferred as the thickener, it is also possible to use other materials which are believed to have a somewhat similar chemical structure but prepared in an entirely different manner. For example, the substance called hydro rubber is made by the hydrogenation of natural rubber or synthetic rubber produced by the polymerization of di-olefins such as butadiene, iso-prene and the like; the hydrogenation is carried out under conditions which effect some change in the structure of the rubber and not only tremendously reduces the degree of unsaturation of the rubber, but also generally reduces its average molecular weight. For instance, a crude natural rubber having a molecular weight of around 200,000 may be converted into a hydro rubber having a molecular weight of about 10,000 and having an iodine number slightly less than 10.

Although the above described hydrocarbon substances are preferred for use as thickener, it is also possible to use other types of oil soluble thickeners having a somewhat similar chemical structure in that they consist essentially of extremely long chain organic compounds of extremely high molecular weight and substantially saturated with respect to hydrogen, generally containing not more than one double bond per molecule, or having an iodine number less than about 10. For instance, polyesters having a molecular weight above about 1,000 and preferably above 5,000 or as high as 40,000 or more, may be used; special polyesters may be prepared by auto-esterification of hydroxy fatty acids having more than 5 carbon atoms between the hydroxyl and carboxyl groups (the hydroxyl group being preferably in a secondary position), in the presence of organic acid catalysts having a dissociation constant greater than $.03 \times 10^{-3}$ (such as adipic acid, chloracetic acid, etc.) and blowing with non-oxidizing gas to remove water formed by the esterification. Another high molecular weight linear type oxygen-containing polymer which may be used as thickener is the product formed by polymerizing methacrylic acid up to the desired molecular weight range, namely above about 1,000.

The amount of this substantially saturated high molecular weight aliphatic hydrocarbon thickener to be used may vary over a fairly wide range, generally between 0.1% or less and 10% or more. When using thickeners having a molecular weight in the lower range of the above mentioned limits, e. g. 15,000, the amount to be used will ordinarily be between ½% and 10%, whereas with the much higher molecular weight thickeners, e. g. 80,000 or 100,000 or more, generally from 0.1% to 5% will suffice.

Instead of adding a thickener such as described above to an oil base stock, a synthetic oil may be used having properties substantially equivalent to those of the above described solution of the thickener in a base stock. For example, it is possible to make lubricating oils having a viscosity index substantially above 100, e. g. 110, by polymerizing low molecular weight olefins such as isobutylene with a halide catalyst at temperatures substantially higher than those used for making the substantially solid polymer thickeners described above. Accordingly, the present invention is applicable broadly to emulsions in which the oil phase comprises essentially an oil adapted to make the emulsion stable over a much broader range of hydrogen ion concentration than those made heretofore. For instance, the invention applies to acid-containing or base-containing emulsions having a pH beyond the limits of 6.5 to 7.5 but between the wider limits of about 5.0 and 9.0. It is believed that some of the synthetic oils produced by methods such as that described above contain, due to formation in situ, a small amount of substantially higher molecular weight polymers of the type previously described as the preferred thickener and having the property reducing the sensitivity of the emulsion to acids, bases or salts or increasing the stability of emulsions containing such chemical compounds.

The alcohols to be used in preparing emulsions according to this invention include particularly the lower monohydric alcohols having less than 7 carbon atoms, e. g. methyl, ethyl, propyl, iso-propyl or even tertiary butyl alcohol, etc. or mixtures thereof, which are characterized by having low surface tension and normally having a great tendency to break emulsions to which they are added. Polyhydric alcohols such as glycol, glycerine and the like have this tendency in a lesser degree but the invention may also be applied to them if desired either alone or together with some of the lower monohydric alcohols. For instance, it is frequently desirable to use a small amount of glycerine along with a much larger proportion of ethyl alcohol.

The quantity of the alcohol to be incorporated in the emulsion may vary between the approximate limits of 15% and 50%, generally from 20% to 40% being preferred. The exact amount to be used and the particular type of alcohol to be used will depend upon the desired rate of evaporation and upon the use intended.

The emulsifying agent preferred is a natural gum of the order Leguminosae, preferably gum tragacanth although others such as kayari, acacia, etc. or mixtures thereof may be used. Ordinarily the amount of emulsifying agent required is between the approximate limits of ½% to 1½%, especially if gum tragacanth is used although up to 5% or more may be required, particularly with less effective emulsifying agents.

The oil to be used in preparing the emulsions, in cases where a thickener is to be added to a suitable oil base stock, may be any mineral, vegetable, fish or mineral oil although it is preferred to use hydrocarbon oils, especially the highly refined mineral white oils which are substantially colorless and odorless. Either these refined mineral oils or refined fatty oils must generally be used in preparing topical lotions or creams as it is possible that unrefined oils might have some harmful effect on the skin. The oil may also be any synthetic type of oil or liquid of suitable viscosity which is substantially insoluble in the alcohol solution used as the aqueous phase of the emulsion. Normally it is preferred to use a mineral white oil having a viscosity in the range of either light or heavy lubricating oils. However, by means of the thickener described above it is possible to use as a base stock a hydrocarbon oil of a very much lower viscosity such as mineral seal oil, kerosene or even gasoline or naphtha and then by dissolving some of the thickener therein, bringing the low viscosity of the base stock up to the required viscosity of the oil solution. It is, of course, understood that when volatile oils are used, either such as gasoline or volatile fatty oils such as some of the essential oils, care must be taken to prevent evaporation because if some of the oil evaporates it will either immediately break the emulsions or eventually cause a thickening of the residual oil and thereby tend to break the emulsions.

Mixtures of hydrocarbon and fatty oils may be used with or without a suitable material serving as mutual solvent to put and keep the two oils in homogeneous solution with each other. The use of such mixtures may be especially desirable when it is intended to incorporate the hydrocarbon thickeners described above into a fatty or oxygen-containing oil. This is best accomplished by first dissolving the thickener in a small amount of hydrocarbon oil and then blending this oil with the desired fatty oil. When two different types of oil are used which are mutually incompatible as, for instance, in the case of mineral oils in the presence of certain fatty oils, the fatty oil, if only present in a very small amount, may be dissolved in the aqueous alcohol phase of the emulsion, although generally in the case of two incompatible oils the emulsion will merely contain a dispersion phase consisting of two separate types of globules, namely, one, the globules of mineral oil consisting either of a solution of a hydrocarbon oil containing a thickener dissolved therein or consisting of a synthetic oil having properties substantially equivalent to such a solution for purposes of the present invention, and the other, separate globules of fatty oil. Generally the amount of oil to be used will vary between the approximate limits of 2% and 20% depending upon the consistency desired in the emulsion itself as well as the consistency desired in the residual non-volatile film if the emulsion is spread out on a solid surface and allowed to evaporate as, for instance, in the use of hand lotions. The amount of oil may also depend upon the amount and type of thickener to be used.

As explained more fully in application Ser. No. 139,206, the use of the preferred thickeners described as a very desirable method of incorporating into the emulsion a fairly large amount of various types of solid powders including abrasives, clays, as well as various pigments. Comminuted solids may also be incorporated advantageously in emulsions containing synthetic oils such as those mentioned above, having properties substantially equivalent to those of a solution of the high molecular weight thickener dissolved in a mineral oil base stock. These powders may be used in any desired amount up to 10% or 15% or even 20% or more under most favorable conditions. An example of the viscosity and V. I. improving properties of the poly-isobutylene thickener is given herewith. To 15 parts by weight of a highly refined mineral white oil marketed under the trade name of Marcol J having a Saybolt viscosity of about 85 seconds at 100° F. and a V. I. of 70, about 1½ parts by weight of poly-isobutylene having an average molecular weight of about 15,000 was added. The resulting solution had a Saybolt viscosity of about 775 seconds at 100° F. and a V. I. of about 130.

In addition to the above described essential constituents of the emulsions of this invention, namely, water, alcohol, emulsifying agent and either an oil having a thickener dissolved therein or a synthetic oil equivalent to such an oil solution, it is also possible to add small amounts of other types of substances such as dyes, perfumes, medicaments, etc. or materials intended to modify or increase the detergent or polishing properties of the emulsion. For example, certain types of solvents may be incorporated such as ortho-dichlorobenzene, preferably in amounts less than 1%. Other types of modifiers may be added; for example, esters, e. g. secondary amyl acetate or ethyl acetate, ketones, high boiling alcohols or organic acids, e. g. oxalic acid or the like or inorganic chemical compounds in small amounts, e. g. ammonium oxalate, ammonium chloride, tri-sodium phosphate, borax and sodium cyanide. Ammonium oxalate is one of the most effective ingredients when using the emulsion as a silver polish. The hydrogen ion concentration of the aqueous phase of the emulsion should generally be maintained within the approximate limits of 6.5 and 7.5 although by the use of the preferred thickened or synthetic oils described above, it is possible to extend these limits considerably; for instance, about 5.0 to 9.0.

In carrying out the invention it has been found preferable to first mix the emulsifying agent such as gum tragacanth with the alcohol and then add the water, allowing a short time for the swelling of the gum in the alcohol solution. Ordinarily no heat is required for this swelling. Next any solid powders to be used are added and well agitated and finally the thickened or synthetic oil is added with agitation, with the result that the entire composition is converted into an emulsion. Any other satisfactory method of preparing the emulsion may be used. Alcohol-soluble addition agents should be added in solution in the alcohol, water-soluble materials should be added in solution in the water and oil-soluble constituents should be added in solution in the oil.

For the sake of illustration, but not intending that the invention be limited thereby, a number of examples are given in the following table:

TABLE

Emulsion formulas (per cent by weight)

| | 1 | 2 | 3 | 4 | 5 | 6 |
|---|---|---|---|---|---|---|
| Alcohol (ethyl) | 35.0 | 30.0 | 30.0 | 30.0 | 30.0 | 30.0 |
| White oil* | 2.0 | 10.0 | 15.0 | 15.0 | 15.0 | |
| Tragacanth | 1.0 | 1.5 | 1.2 | 1.2 | 1.2 | 1.2 |
| Acacia | | | 1.2 | 1.2 | 1.2 | 1.2 |
| Poly-isobutylene (about 15,000 m.) | 0.5 | 1.0 | 1.5 | 1.5 | 1.5 | 1.5 |
| Menthol | | | | 0.4 | 0.4 | |
| Camphor | | | | 0.4 | 0.4 | |
| Tannic acid | | | 2.0 | | | |
| Sodium bicarbonate | | | | | 5.0 | |
| Calamine (ZnO+Fe$_2$O$_3$) | | | | | | 10.0 |
| Titanium dioxide | | | | | | 5.0 |
| Zinc oxide | | | | | | 5.0 |
| Gasoline | | | | | | 15.0 |
| Water q. s. 100% | Bal. | Bal. | Bal. | Bal. | Bal. | Bal. |

*Had a Saybolt viscosity of about 80 to 90 sec./100° F.

In the above table Formulas 1 and 2 are simple formulas with only the minimum number of constituents. Formula 3 is an excellent preparation for the treatment of sunburn and minor burns where the skin has not been actually broken. It is remarkable that this formula is stable because it has been found impossible to incorporate as much as 2% of an acid like tannic acid into an emulsion containing a substantial amount of alcohol. Formula 4 is another example of a burn remedy in which the mildly basic properties of sodium bicarbonate are used to furnish a soothing and healing effect. Formula 5 is an example of an ointment-like preparation of a somewhat similar nature, the 10% of calamine having the effect of substantially increasing the viscosity of the finished emulsion. Formula 6 is an example of a shoe cleaner emulsion; here the poly-isobutylene is very helpful in raising the normally low viscosity of the gasoline up to such an amount that emulsification is readily accomplished even in the presence of 30% alcohol.

It is not intended that the invention be limited by any of the specific examples which have been given merely for the sake of illustration nor by any theories as to the mechanism of the operation of the invention, but only by the appended claims in which it is intended to claim all novelty inherent in the invention as broadly as the prior art permits.

We claim:

1. A stable emulsion comprising at least 30% alcohol, a mineral oil, a gum emulsifier, a polyisobutylene, water and a substance giving the composition a pH between 5 and 9.

2. A stable emulsion comprising over 30% alcohol, a mineral oil, water, gum tragacanth, a polyisobutylene having a molecular weight between 2000 and 300,000, and a substance giving the emulsion a pH between 5 and 9.

3. A stable emulsion consisting of an alcohol 30–50%; gum tragacanth .1–5%, oil 1.20%, polyisobutylene .1–10% and the balance water.

DELBERT F. BROWN.
HUGH C. DE HOFF.